Feb. 28, 1939.  R. NOTSON  2,148,707
DEMOUNTABLE WHEEL
Filed April 14, 1938  2 Sheets-Sheet 1

Inventor
Ross Notson

By Clarence A. O'Brien
and Hyman Berman
Attorneys

Feb. 28, 1939.                R. NOTSON                2,148,707
                         DEMOUNTABLE WHEEL
             Filed April 14, 1938              2 Sheets-Sheet 2

Inventor
Ross Notson

By Clarence A. O'Brien
and Hyman Berman
Attorneys

Patented Feb. 28, 1939

2,148,707

UNITED STATES PATENT OFFICE 2,148,707

DEMOUNTABLE WHEEL

Ross Notson, Rockport, Mo.

Application April 14, 1938, Serial No. 202,077

4 Claims. (Cl. 301—9)

This invention appertains to new and useful improvements in vehicle wheel structures and more particularly to a wheel structure of the quick demountable type.

The principal object of the present invention is to provide a wheel structure which can be quickly demounted without requiring the removal of nuts from the usual wheel securing bolts.

Other objects and advantages of the invention will become apparent to the reader of the following specification.

Figure 1:
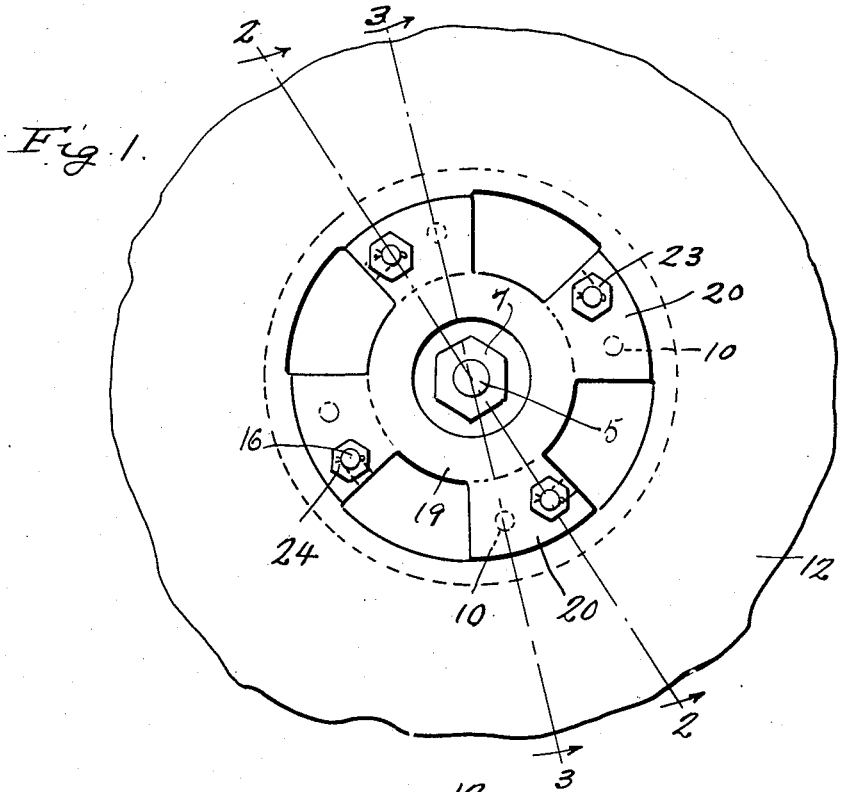
Figure 1 represents a fragmentary outside elevational view of the wheel.

Referring to the drawings wherein like numerals designate like parts, it can be seen that numeral 5 represents the axle of a vehicle rear end. The front axle will be somewhat different in construction as will the associated parts but the part contributing to the present invention will be identical.

Figure 2:
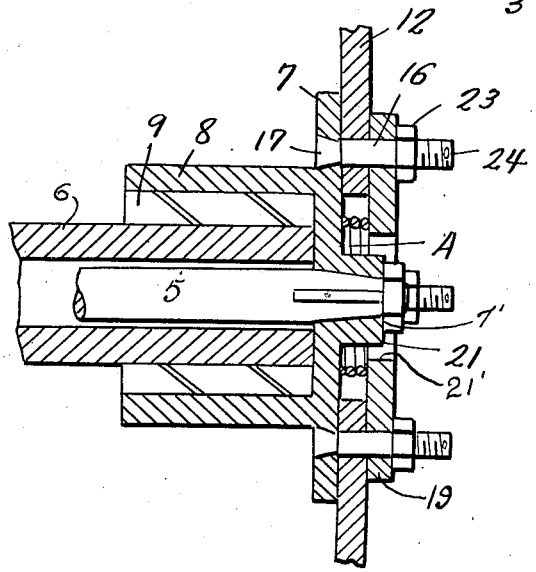
Figure 2 is a fragmentary sectional view taken substantially on line 2—2 of Figure 1.
Figure 3:
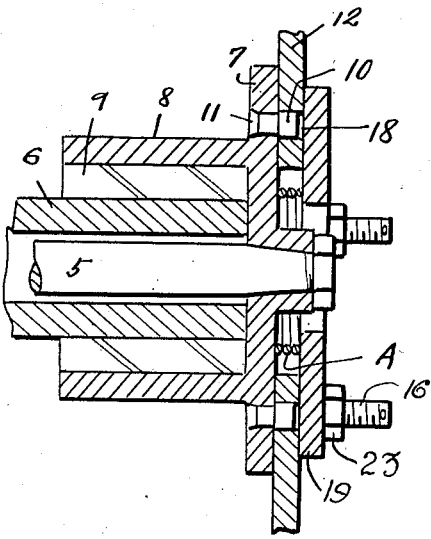
Figure 3 is a fragmentary sectional view taken substantially on line 3—3 of Figure 1.

Numeral 6 in Figures 2 and 3 represents the axle housing. Numeral 7 denotes a disk from which extends the cylindrical shell 8 in which the bearings 9 are located. The disk 7 is formed with a hub 21 for receiving the end of the axle 5 and nuts 7' hold the hub on the axle.

Studs 10 suitably anchored as at 11 in the disk 7 project beyond the outside face of the disk 7.

Figure 4:
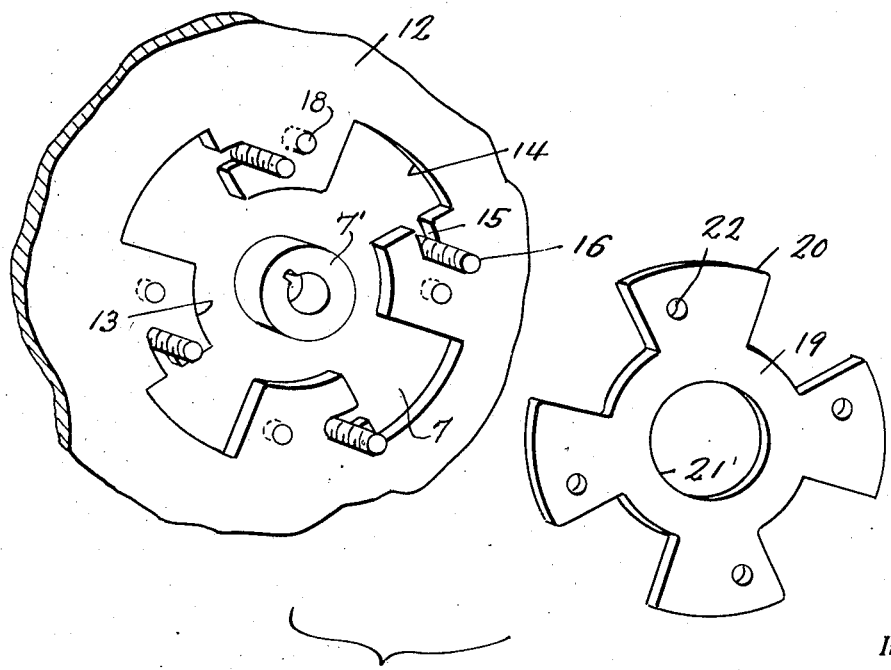
Figure 4 is a fragmentary exploded view showing the parts in separated relation.

The numeral 12 indicates a stamped wheel disk and this as shown in Figure 4 is stamped out with a circular central opening 13 from which radiates the dove-tail shaped openings 14 and one edge portion of each of these dove-tail shaped openings 14 is provided with a notch 15, these notches receiving the threaded bolts 16 extending from the aforementioned disk 7 and anchored thereto as at 17.

The wheel disk 12 is also provided with openings 18 equal in number to the number of studs 10 so that these studs are received in the openings 18 when the disk 12 has been rotated so that the notches 15 have received the bolts 16 and the wheel disk 12 has been forced inwardly against the disk 7.

Numeral 19 denotes the clamping plate which is provided with the dove-tail shaped projections 20 which radiate from the plate 19. This plate is provided with the central opening 21 for receiving the hub structure 21.

Each of the dove-tail shaped projections 20 is provided with an opening 22 for receiving a threaded bolt 16. Nuts 23 are provided on these bolts, but are never removed as they are stopped by cotter pins or other suitable keys 24 before complete removal.

When the wheel member 12 is to be removed, the nuts 23 are loosened so as to release the clamping action of plate 19 on the member 12 to permit the member 12 to be pulled forwardly out of engagement with the studs 10 and then said member 12 is given a partial turning movement to cause the notches 15 to move away from the bolts 16 and to place the openings 14 in register with the projections 20 of plate 19 and then the member 12 is pulled forwardly to cause said projections 20 to pass through the openings 14 and thus the wheel member 12 is removed from the axle assembly.

As can be seen in Figure 2, a spring A is employed between the disk 7 and the plate 19, this spring being wholly confined within the central opening 13 of the wheel 12 when the nuts 23 are holding the plate 19 against the wheel 12. The purpose of this spring A is to automatically force the plate 19 outwardly so that the wheel 12 can be readily disengaged from the studs 10 without any inconvenience on the part of the workman.

Having described the invention what is claimed as new is:

1. A wheel structure comprising a plate having a plurality of threaded members extending therefrom, a wheel structure having its central portion formed with an opening, said wheel structure being formed with adjacent openings radiating from the central opening, said wheel structure being formed with notches in the edge portions of the said additional openings to receive the threaded bolts, and nuts on the bolts.

2. A wheel structure comprising a plate having a plurality of threaded members extending therefrom, a wheel structure having its central portion formed with an opening, said wheel structure being formed with adjacent openings radiating from the central opening, said wheel structure being formed with notches in the edge portions of the said additional openings to receive the threaded bolts, nuts on the bolts, and stop means on the outer ends of the bolts to prevent complete displacement of the nuts from the bolts.

3. A wheel structure comprising a plate having a plurality of threaded members extending therefrom, a wheel structure having its central portion formed with an opening, said wheel structure being formed with adjacent openings radiating from the central opening, said wheel structure being formed with notches in the edge portions of the said additional openings to receive the threaded bolts, nuts on the bolts, a clamping plate provided with radially extending projections each formed with an opening for receiving a bolt.

4. A wheel structure comprising a plate having a plurality of threaded members extending therefrom, a wheel structure having its central portion formed with an opening, said wheel structure being formed with adjacent openings radiating from the central opening, said wheel structure being formed with notches in the edge portions of the said additional openings to receive the threaded bolts, nuts on the bolts, said plate being provided with a plurality of outwardly extending studs, said wheel structure having its central portion formed with small openings for receiving the said studs.

ROSS NOTSON.